United States Patent
Srivastava et al.

(10) Patent No.: US 7,380,239 B1
(45) Date of Patent: May 27, 2008

(54) METHOD AND MECHANISM FOR DIAGNOSING COMPUTER APPLICATIONS USING TRACES

(75) Inventors: Alok K. Srivastava, Newark, CA (US); Surojit Chatterjee, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 200 days.

(21) Appl. No.: 09/872,647

(22) Filed: May 31, 2001

(51) Int. Cl.
*G06F 9/44* (2006.01)
*G06F 11/00* (2006.01)

(52) U.S. Cl. .................. 717/128; 714/45; 717/126; 717/127

(58) Field of Classification Search ........ 717/124–128, 717/130, 142, 108; 707/10, 101, 500.1, 512, 707/102; 715/501.1; 345/440; 705/1; 709/203; 702/187; 714/45
See application file for complete search history.

(56) References Cited

U.S. PATENT DOCUMENTS

| | | | |
|---|---|---|---|
| 3,707,725 A | 12/1972 | Dellhelm | |
| 4,462,077 A | 7/1984 | York | |
| 5,390,316 A | 2/1995 | Cramer et al. | |
| 5,537,319 A | 7/1996 | Schoen | |
| 5,594,904 A | 1/1997 | Linnermark et al. | |
| 5,642,478 A | 6/1997 | Chen et al. | |
| 5,649,085 A * | 7/1997 | Lehr | 345/440 |
| 5,689,636 A | 11/1997 | Kleber et al. | |
| 5,708,825 A * | 1/1998 | Sotomayor | 715/501.1 |
| 5,870,606 A | 2/1999 | Lindsey | |
| 5,920,719 A * | 7/1999 | Sutton et al. | 717/130 |
| 5,963,740 A | 10/1999 | Srivastava et al. | |
| 6,026,362 A * | 2/2000 | Kim et al. | 705/1 |
| 6,083,281 A | 7/2000 | Diec et al. | |
| 6,164,841 A | 12/2000 | Mattson, Jr. et al. | |
| 6,189,141 B1 | 2/2001 | Benitez et al. | |
| 6,202,099 B1 | 3/2001 | Gillies et al. | |
| 6,202,199 B1 | 3/2001 | Wygodny et al. | |
| 6,243,864 B1 * | 6/2001 | Odani et al. | 717/154 |
| 6,282,701 B1 * | 8/2001 | Wygodny et al. | 717/125 |
| 6,289,503 B1 | 9/2001 | Berry et al. | |
| 6,311,326 B1 | 10/2001 | Shagam | |
| 6,338,159 B1 | 1/2002 | Alexander, III et al. | |
| 6,339,775 B1 | 1/2002 | Zamanian et al. | |
| 6,339,776 B2 * | 1/2002 | Dayani-Fard et al. | 707/102 |
| 6,349,406 B1 * | 2/2002 | Levine et al. | 717/128 |
| 6,351,844 B1 | 2/2002 | Bala | |
| 6,353,898 B1 | 3/2002 | Wipfel et al. | |
| 6,353,924 B1 * | 3/2002 | Ayers et al. | 717/128 |
| 6,467,083 B1 * | 10/2002 | Yamashita | 717/128 |
| 6,470,349 B1 * | 10/2002 | Heninger et al. | 707/102 |

(Continued)

OTHER PUBLICATIONS

Helmbold et al., Detecting data races from sequential traces, 1991, IEEE, p. 408-417.*

(Continued)

*Primary Examiner*—Wei Zhen
*Assistant Examiner*—Satish S Rampuria
(74) *Attorney, Agent, or Firm*—Bingham McCutchen LLP (57) ABSTRACT

A method and mechanism for diagnosis of computer applications using traces is disclosed. Trace messages can be materialized using a markup language syntax. Hyperlinks can be placed in the trace messages to facilitate navigation between sets of related traces. Specific traces or portions of traces can be emphasized.

30 Claims, 6 Drawing Sheets

U.S. PATENT DOCUMENTS

| | | | |
|---|---|---|---|
| 6,480,886 B1 | 11/2002 | Paice | |
| 6,507,805 B1* | 1/2003 | Gordon et al. | 702/186 |
| 6,513,155 B1* | 1/2003 | Alexander et al. | 717/124 |
| 6,546,548 B1* | 4/2003 | Berry et al. | 717/128 |
| 6,553,564 B1* | 4/2003 | Alexander et al. | 717/128 |
| 6,574,792 B1* | 6/2003 | Easton | 717/142 |
| 6,584,491 B1 | 6/2003 | Niemi et al. | |
| 6,598,012 B1* | 7/2003 | Berry et al. | 702/187 |
| 6,654,749 B1 | 11/2003 | Nashed | |
| 6,658,652 B1 | 12/2003 | Alexander, III et al. | |
| 6,678,883 B1 | 1/2004 | Berry et al. | |
| 6,694,507 B2* | 2/2004 | Arnold et al. | 717/108 |
| 6,708,173 B1* | 3/2004 | Behr et al. | 707/10 |
| 6,715,140 B1* | 3/2004 | Haga | 717/130 |
| 6,732,095 B1 | 5/2004 | Warshavsky et al. | |
| 6,738,778 B1* | 5/2004 | Williamson et al. | 707/101 |
| 6,738,965 B1* | 5/2004 | Webster | 717/128 |
| 6,748,583 B2* | 6/2004 | Aizenbud-Reshef et al. | 717/127 |
| 6,751,753 B2 | 6/2004 | Nguyen et al. | |
| 6,754,890 B1 | 6/2004 | Berry et al. | |
| 6,802,054 B2* | 10/2004 | Faraj | 717/128 |
| 6,826,747 B1 | 11/2004 | Augsburg et al. | |
| 6,877,081 B2 | 4/2005 | Herger et al. | |
| 6,944,797 B1* | 9/2005 | Guthrie et al. | 714/45 |
| 7,017,084 B2 | 3/2006 | Ng et al. | |
| 7,043,668 B1* | 5/2006 | Treue et al. | 714/45 |
| 7,165,190 B1* | 1/2007 | Srivastava et al. | 714/38 |
| 2001/0011360 A1 | 8/2001 | Shigeta | |
| 2002/0004803 A1* | 1/2002 | Serebrennikov | 707/513 |
| 2002/0016771 A1 | 2/2002 | Carothers et al. | |
| 2002/0019837 A1* | 2/2002 | Balnaves | 707/512 |
| 2002/0066081 A1* | 5/2002 | Duesterwald et al. | 717/128 |
| 2002/0073063 A1 | 6/2002 | Faraj | |
| 2002/0078143 A1* | 6/2002 | De Boor et al. | 709/203 |
| 2002/0087592 A1 | 7/2002 | Ghani | |
| 2002/0087949 A1 | 7/2002 | Golender et al. | |
| 2002/0095660 A1* | 7/2002 | O'Brien et al. | 717/127 |
| 2002/0107882 A1* | 8/2002 | Gorelick et al. | 707/500.1 |
| 2002/0120634 A1 | 8/2002 | Min et al. | |
| 2002/0133806 A1 | 9/2002 | Flanagan et al. | |
| 2002/0161672 A1 | 10/2002 | Banks et al. | |
| 2003/0088854 A1 | 5/2003 | Wygodny et al. | |
| 2003/0140045 A1* | 7/2003 | Heninger et al. | 707/10 |
| 2003/0196192 A1 | 10/2003 | Barclay et al. | |
| 2004/0158819 A1 | 8/2004 | Cuomo et al. | |
| 2004/0205718 A1 | 10/2004 | Reynders | |
| 2004/0210877 A1 | 10/2004 | Sluiman et al. | |
| 2004/0216091 A1 | 10/2004 | Groeschel | |
| 2004/0216092 A1 | 10/2004 | Ayers et al. | |

OTHER PUBLICATIONS

Tolujev et al., Assessment of simulation models based on traces-file analysis: A metamodeling approach, 1998, IEEE, vol. 1, p. 443-450.*

Helmbold et al., Determining possible event orders by analysing sequential traces, IEEE, vol. 4, p. 827-840.*

Palnitkar et al., Finite state machine trace analysis program, 1994, IEEE, p. 52-57.* www.google.com, searched on Mar. 21, 2005, pp. 1-12.*

A tool for testing hypermedia systems, Leung, H.K.N.; EUROMICRO Conference, 1999. Proceedings. 25th vol. 2, Sep. 8-10, 1999, IEEE, pp. 202-209 vol. 2.*

Reverse mapping of referral links from storage hierarchy for Web documents, Chen Ding; Chi-Hung Chi; Tam, V.; Tools with Artificial Intelligence, 2000. ICTAI 2000. Proceedings. 12th IEEE International Conference on, Nov. 13-15, 2000, IEEE, pp. 216-219.*

Using technology to tailor electronic information to users, Surray, A.; Lavoie, R.; Professional Communication Conference, 1996. IPCC '96 Proceedings. 'Communication on the Fast Track'., International, Sep. 18-20, 1996, IEEE, pp. 209-214.*

Helmbold et al., Determining possible event orders by analysing sequential traces, IEEE, vol. 4, p. 827-840, 1993.*

Agosti, Maristelle and Alan Smeaton. 1996. *Information Retrieval and Hypertext*. Boston: Kluwer Academic Publishers. ISBN 0-7923-9710-X.

Akscyn, Robert, Donald McCracken, and Elise Yoder. 1987. "KMS: A Distributed Hypermedia System for Managing Knowledge in Organizations." In *Proceedings of Hypertext '87*, Chapel Hill, NC. Nov. 13-15, 1987. NY: Association for Computing Machinery Press, pp. 1-20.

Berners-Lee, T. and L. Masinter, editors. Dec. 1994. "Uniform Resource Locators (URL)". IETF document RFC 17338.

Bradner, S. editor. Key words for use in RFCs to Indicate Requirement Levels. Mar. 1997, http://www.ietf.org/rfc/rfc2119.txt.

Bray, Tim, Dave Hollander, and Andrew Layman, editors. Namespaces in XML. Textuality, Hewlett-Packard, and Microsoft. World Wide Web Consortium, 1999, http://www.w3.org/TR/REC-xml-names/.

Bray, Tim, Jean Paoli, and C.M. Sperberg-McQueen, editors. Extensible Markup Language (XML) 1.0 World Wide Web Consortium, Oct. 2000, http://www.w3.org/TR/REC-xml.

Bush, Vannevar. 1945. "As We May Think." *Atlantic Monthly* 176 Jul. 1945, pp. 101-108.

Catano, James V. 1979. "Poerty and Computers: Experimenting with the Communal Text." In *Computers and the Humanities* 13 (9): pp. 269-275.

Chatterjee, Sunojit, "Trace Navigation and Analyzer Tool Prototype (High Level Design: First Draft" Apr. 12, 2000.

Clark, James and Steve DeRose, editors. XML Path Language (XPath). World Wide Web Consortium, 1999, http://www.w3.org/TR/xpath.

Conklin, Jeff. 1987. "Hypertext: An Introduction and Survey." *IEEE Computer* 20 (9): pp. 17-41.

Cowan, John and David Megginson, editors. XML Information Set. World Wide Web Consortium, Dec. 1999, http://www.w3.org/TR/xml-infoset-19991220.

DeRose, Steven and Andries van Dam. 1999. "Document structure and markup in the FRESS Hypertext System." Markup Languages 1 (1) Winter. Cambridge: MIT Press: pp. 7-32.

DeRose, Steve, editor. XML XLink Requirements Version 1.0 Brown University. Seekonk: World Wide Web Consortium, 1999.

DeRose, Steve, editor. XML XPointer Language Requirements Version 1.0. World Wide Web Consortium, 1999. (See http://www.w3.org/TR/NOTE-xptr-req.).

DeRose, Steve, Eve Maler, David Orchard, and Ben Trafford, editors. XML Linking Language (XLink). World Wide Web Consortium, Dec. 2000. http://www.w3.org/TR/xlink/.

DeRose, Steven J. 1989. "Expanding the Notion of Links." In *Proceedings of Hypertext '89*, Pittsburgh, PA. NY: Association for Computing Machinery Press.

Document Object Model (DOM) Level 2 Specification: Version 1.0. World Wide Web Consortium, 1999. (See http://www.w3.org/TR/DOM-Level-2/.).

Dürst, Martin et al., eds. "*Character Model for the World Wide Web 1.0*", World Wide Web Consortium, 2001. http://www.w3.org/TR/2001/WD-charmod-20010126/.

Engelbart, Douglas C. 1963. "A Conceptual Framework for the Augmentation of Man's Intellect". In *Vistas in Information Handling*, vol. 1 (P. Howerton, ed.). Washington, DC: Spartan Books: 1-29. Reprinted in Greif, Irene (ed.), 1988. *Computer-Supported Cooperative Work: A Book of Readings*. San Mateo, California: Morgan Kaufmann Publishers, pp. 35-65. ISBN 0934613575.

Furuta, Richard, Frank M. Shipmann III, Catherine C. Marshall, Donald Brenner, and Hao-wei Hsieh. 1997. "Hypertext paths and the World-Wide Web: Experiences with Walden's Paths." In *Proceedings of Hypertext '97*. NY: Association for Computing Machinery Press.

Garrett, L. Nancy, Karen E. Smith, and Norman Meyrowitz. 1986. "Intermedia: Issues, Strategies, and Tactics in the Design of a Hypermedia System." In *Proceedings of the Conference on Computer-Supported Cooperative Work*.

Gibson, David, Jon Kleinberg, and Prabhakar Raghavan. 1998. "Inferring Web Communities from Link Topology." In *Proceedings of Hypertext '98*, Pittsburgh, PA. NY: Association for Computing Machinery Press.

Grønbaek, Kaj and Randall H. Trigg. 1996. "Toward a Dexter-based model for open hypermedia: Unifying embedded references and link objects." In Proceedings of Hypertext '96. NY: Association for Computing Machinery Press. Also available online.

Halasz, Frank. 1987. "Reflections on NoteCards: Seven Issues for the Next Generation of Hypermedia Systems." Address presented at Hypertext '87, Nov. 13-15, 1987. Reprinted in *Communications of the Association for Computing Machinery* 31 (7), Jul. 1988: 836-855.

Halasz, Frank. 1994. "The Dexter Hypertext Reference Model." In *Communications of the Association for Computing Machinery* 37 (2), Feb. 1994: 30-39.

Hall, Wendy, Hugh Davis, and Gerard Hutchings. 1996. *Rethinking Hypermedia: The Microcosm Approach*. Boston: Kluwer Academic Publishers. ISBN 0-7923-9679-0.

Hardman, Lynda, Dick C. A. Bulterman, and Guido van Rossum. 1994. "The Amsterdam Hypermedia Model: Adding Time and Context to the Dexter Model." In *Communications of the Association for Computing Machinery* 37.2 (Feb. 1994): 50-63.

Hinden, R., et al., "Format for Literal IPv6 Addresses in URL's." Internet Engineering Task Force, 1999. (See http://www.ietf.org/rfc/rfc2732.txt.).

ISO/IEC 10744-1992 (E). Information technology—Hypermedia/Time-based Structuring Language (HyTime). Geneva: International Organization for Standardization, 1992. Extended Facilities Annex. [Geneva]: International Organization for Standardization, 1996. (See http://www.ornl.gov/sgml/wg8/docs/n1920/html/n1920.html.).

Kahn, Paul. 1991. "Linking Together Books: Experiments in Adapting Published Material into Intermedia Documents." In Paul Delany and George P. Landow (eds), *Hypermedia and Literary Studies*. Cambridge: MIT Press.

Landow, George P. 1987. "Relationally Encoded Links and the Rhetoric of Hypertext." In *Proceedings of Hypertext '87*, Chapel Hill, NC, Nov. 13-15, 1987. NY: Association for Computing Machinery Press: 331-334.

Lassila, Ora and Ralph Swick, editors. Resource Description Framework (RDF) Model and Syntax Specification. World Wide Web Consortium, 1999. http://www.w3.org/TR/REC-rdf-syntax/.

Maler, Eve and Steve DeRose, editors. XML Linking Language (XLink) World Wide Web Consortium, Mar. 1998. http://www.w3.org/TR/1998/WD-xlink-19980303.

Marsh, Jonathan, editor. XML Base (XBase). World Wide Web Consortium, Dec. 1999. http://www.w3.org/TR/1999/WD-xmlbase-19991220.

Marshall, Catherine C., Frank M. Shipman, III, and James H. Coombs. 1994. "VIKI: Spatial Hypertext Supporting Emergent Structure". In *Proceedings of the 1994 European Conference on Hypertext*. NY: Assocation for Computing Machinery Press.

Meyrowitz, Norman. 1986. "Intermedia: the Architecture and Construction of an Object-Oriented Hypermedia system and Applications Framework." In *Proceedings of OOPSLA*. Portland, OR.

Nelson, Theodore H, "Literary Machines", Mindful Press, Sausalito, 1992.

Raggett, Dave et al., "HTML 4.01 Specification". World Wide Web Consortium, Dec. 1999. http://www.w3.org/TR/html4/.

Sperberg-McQueen C.M. and Lou Burnard, editors.Guidelines for Electronic Text Encoding and Interchange. Association for Computers and the Humanities (ACH), Association for Computational Linguistics (ACL). and Association for Literary and Linguistic Computing (ALLC), Chicago, Oxford: Text Encoding Initiative, 1994.

Trigg, Randall H. 1988. "Guided Tours and Tabletops: Tools for Communicating in a Hypertext Environment." In *ACM Transactions on Office Information Systems*, 6.4 (Oct. 1988): 398-414.

Trigg, Randall H. 1991. "From Trailblazing to Guided Tours: The Legacy of Vannevar Bush's Vision of Hypertext Use." In Nyce, James M. and Paul Kahn, eds, 1991, From Memex to Hypertext: Vannevar Bush and the Mind's Machine. San Diego: Academic Press, pp. 353-367. A thorough review.

Van Ossenbruggen, Jacco, Anton Eliëns and Lloyd Rutledge. "The Role of XML in Open Hypermedia Systems." Position paper for the 4th Workshop on Open Hypermedia Systems, ACM Hypertext '98. http://aue.auc.dk/~kock/OHS-HT98/Papers/ossenbruggen.html.

Whitehead, E.,"XML Media Types." Internet Engineering Task Force, Network Working Group, Jul. 1998. http://www.ietf.org/rfc/rfc2376.txt.

*XHTML 1.0: The Extensible HyperText Markup Language*. World Wide Web Consortium, Jan. 2000. (See http://www.w3.org/TR/2000/REC-xhtml-20000126/.

Yankelovich, Nicole, Bernard J. Haan, Norman K. Meyrowitz, and Steven M. Drucker. 1988. "Intermedia: The Concept and the Construction of a Seamless Information Environment." *IEEE Computer* (Jan. 1988): 81-96.

Yankelovich, Nicole, Norman Meyrowitz, and Andries van Dam. 1985. "Reading and Writing the Electronic Book." *IEEE Computer* 18 (Oct. 1985): 1-30.

Yergeau, F., Network Working Group, "UTF-8, a transformation format of ISO 10646." Internet Engineering Task Force, 1998. http://www.ietf.org/rfc/rfc2279.txt.

Zellweger, Polle T. 1989. "Scripted Documents: A Hypermedia Path Mechanism." In *Proceedings of Hypertext '89*. NY: Association for Computing Machinery Press, Nov. 1989.

Biswas, P. et al. "Trace Driven Analysis of Write Caching Policies for Disks" *Proceedings of the 1993 ACM SIGMETRICS Conference on Measurement and Modeling of Computer Systems* (1993) pp. 13-23.

Borg, A. et al. "Generation and Analysis of Very Long Address Traces" *Proceedings of the 17th Annual International Symposium on Computer Architecture* (May 1990) 18(3):270-279.

Chang, P. P. and W.-M. W. Hwu "Trace Selection for Compiling Large C Application Programs to Microcode" *Proceedings of the 21st Annual Workshop on Microprogramming and Microarchitecture* (Jan. 1988) pp. 21-29.

Colby, C. and P. Lee "Trace-Based Program Analysis" *Proceedings of the 23rd ACM SIGPLAN-SIGACT Symposium on Principles of Programming Languages* (Jan. 1996) pp. 195-207.

Dan, A. et al. "Characterization of Database Access Pattern for Analytic Prediction of Buffer Hit Probability" *VLBD Journal* (1995) 4:127-154.

Ducassé, M. "Coca: An automated Debugger for C" *Proceedings of the 21st International Conference on Software Engineering* (May 1999) pp. 504-513.

Ezust, S.A. and G. v. Bochmann "An Automatic Trace Analysis Tool Generator for Estelle Specifications" *Proceedings of the Conference on Applications, Technologies, Architectures and Protocols for Computer Communication* (Oct. 1995) 25(4):175-184.

Goldszmidt, G. S. and S. Yemini "High-Level Language Debugging for Concurrent Programs" *ACM Transactions on Computer Systems (TOCS)* (Nov. 1990) 8(4):311-336.

Hsu, W. W. et al. "I/O Reference Behavior of Production Database Workloads and the TPC Benchmarks—An Analysis at the Logical Level" *ACM Transactions on Database Systems (TODS)* (Mar. 2001) 26(1):96-143.

LeDoux, C. H. and D. S. Parker, Jr. "Saving Traces for ADA Debugging" *Proceedings of the 1985 Annual ACM SIGAda International Conference on Ada* (May 1985) V(2):97-108.

Lencevicius, R. et al. "Third Eye—Specification-Based Analysis of Software Execution Traces" *Proceedings of the 22nd International Conference on Software Engineering* (Jun. 2000) p. 772.

Lo. J. L. et al. "An Analysis of Database Workload Performance on Simultaneous Multithreaded Processors" *Proceedings of the 25th Annual International Symposium on Computer Architecture* (Apr. 1998) 26(3):39-50.

Miller, B.P. and J.-D. Choi, "A Mechanism for Efficient Debugging of Parallel Programs" *Proceedings of the ACM SIGPLAN 1998 Conference on Programming Language Design and Implementation* (Jun. 1988) pp. 135-144.

Putrycz, E. "Using Trace Analysis for Improving Performance in COTS Systems" *Proceedings of the 2004 Conference of the Centre for Advanced Studies on Collaborative Research* (Oct. 2004) pp. 1-13.

Rahm. E. "Empirical Performance Evaluation of Concurrency and Coherency Control Protocols for Database Sharing Systems" *ACM Transactions on Database Systems (TODS)* (Jun. 1993) 18(2):333-377.

Ramakrishnan, K. M. "Analysis of File I/O Traces in Commercial Computing Environments" *Proceedings of the 1992 ACM SIGMETRICS Joint International Conference on Measurement and Modeling of Computer Systems* (Jun. 1992) 20(1):78-90.

Reiss, S.P. and M. Renieris "Generating Java Trace Data" *Proceedings of the ACM 2000 Conference on Java Grande* (Jun. 2000) pp. 71-77.

Singhal, V. and A.J. Smith "Analysis of locking behavior in three real database systems" *The VLDB Journal* (1997) 6:40-52.

IBM Technical Disclosure Bulletin "Checkref: Method for Effectively Identifying IBM Bookmaster Document Markup Language Coding Errors" (Feb. 1994) pp. 379-392.

Metalanguage, http://en.wikipedia.org/wiki/Meta-language, accessed on Feb. 2, 2006, pp. 1-3.

Webster, J. (ed). *Wiley Encyclopedia of Electrical and Electronics Engineering*, 1999, pp. 33-39, John Wiley & Sons, Inc., USA.

* cited by examiner

METHOD AND MECHANISM FOR DIAGNOSING COMPUTER APPLICATIONS USING TRACES

BACKGROUND AND SUMMARY

Tracing is an approach for logging the state of computer applications at different points during its course of execution. Tracing is normally implemented by inserting statements in the computer application code that outputs status/state messages ("traces") as the statements are encountered during the execution of the code. Statements to generate traces are purposely placed in the computer application code to generate traces corresponding to activities of interest performed by specific sections of the code. The generated trace messages can be collected and stored during the execution of the application to form a trace log.

Programmers often use tracing and trace logs to diagnose problems or errors that arise during the execution of a computer application. When such a problem or error is encountered, trace logs are analyzed to correlate trace messages with the application code to determine the sequence, origin, and effects of different events in the systems and how they impact each other. This process allows analysis/diagnoses of unexpected behavior or programming errors that cause problems in the application code.

In a parallel or distributed environment, there are potentially a number of distributed network nodes, with each node running a number of distinct execution entities such as threads, tasks or processes (hereinafter referred to as "threads"). In many modern computer applications, these threads perform complex interactions with each other, even across the network to threads on other nodes. Often, each of the distributed nodes maintains a separate log file to store traces for their respective threads. Each distributed node may also maintain multiple trace logs corresponding to separate threads on that node.

Diagnosing problems using multiple trace logs often involves a manual process of repeatedly inspecting different sets of the trace logs in various orders to map the sequence and execution of events in the application code. This manual process attempts to correlate events in the system(s) with the application code to construct likely execution scenarios that identify root causes of actual or potential execution problems. Even in a modestly distributed system of a few nodes, this manual process comprises a significantly complex task, very much limited by the capacity of a human mind to comprehend and concurrently analyze many event scenarios across multiple threads on multiple nodes. Therefore, analyzing traces to diagnose applications in parallel and/or distributed systems is often a time consuming and difficult exercise fraught with the potential for human limitations to render the diagnoses process unsuccessful. In many cases, the complexity of manual trace analysis causes the programmer to overlook or misdiagnose the real significance of events captured in the trace logs. With the increasing proliferation of more powerful computer systems capable of greater execution loads across more nodes, the scope of this problem can only increase.

The present invention is directed to a method and mechanism for improved diagnoses of computer systems and applications using tracing. According to an aspect of one embodiment of the invention, trace messages are materialized using a markup language syntax. Hyperlinks can be placed in the trace messages to facilitate navigation between sets of related traces. Specific traces or portions of traces can be emphasized using markup language tools to highlight text. Another aspect of an embodiment of the invention pertains to a method and mechanism for generating trace messages in a markup language syntax. Further aspects, objects, and advantages of the invention are described below in the detailed description, drawings, and claims.

BRIEF DESCRIPTION OF THE DRAWINGS

The accompanying drawings are included to provide a further understanding of the invention and, together with the Detailed Description, serve to explain the principles of the invention.

DETAILED DESCRIPTION

The present invention is disclosed in an embodiment as a method and mechanism for implementing tracing and trace logs. The disclosed embodiment of the invention is directed to trace logs for distributed and parallel systems. However, the principles presented here are equally applicable to trace log(s) in other system architecture configurations, including single node configurations, and thus the scope of the invention is not to be limited to the exact embodiment shown herein.

An aspect of one embodiment of the present invention is directed to traces comprising markup language syntax. A markup language is a collected set of syntax definitions that describes the structure and format of a document page. A widely used markup language is the Standard Generalized Markup language ("SGML"). A common implementation of SGML is the HyperText Markup Language ("HTML"), which is a specific variant of SGML used for the world wide web. The Extensible Markup Language ("XML") is another variant of SGML. For explanatory purposes only, the invention is described using HTML-compliant markup language syntax. However, it is noted that the present invention is not limited to any specific markup language syntax, but is configurable to work with many markup languages.

Figure 1:
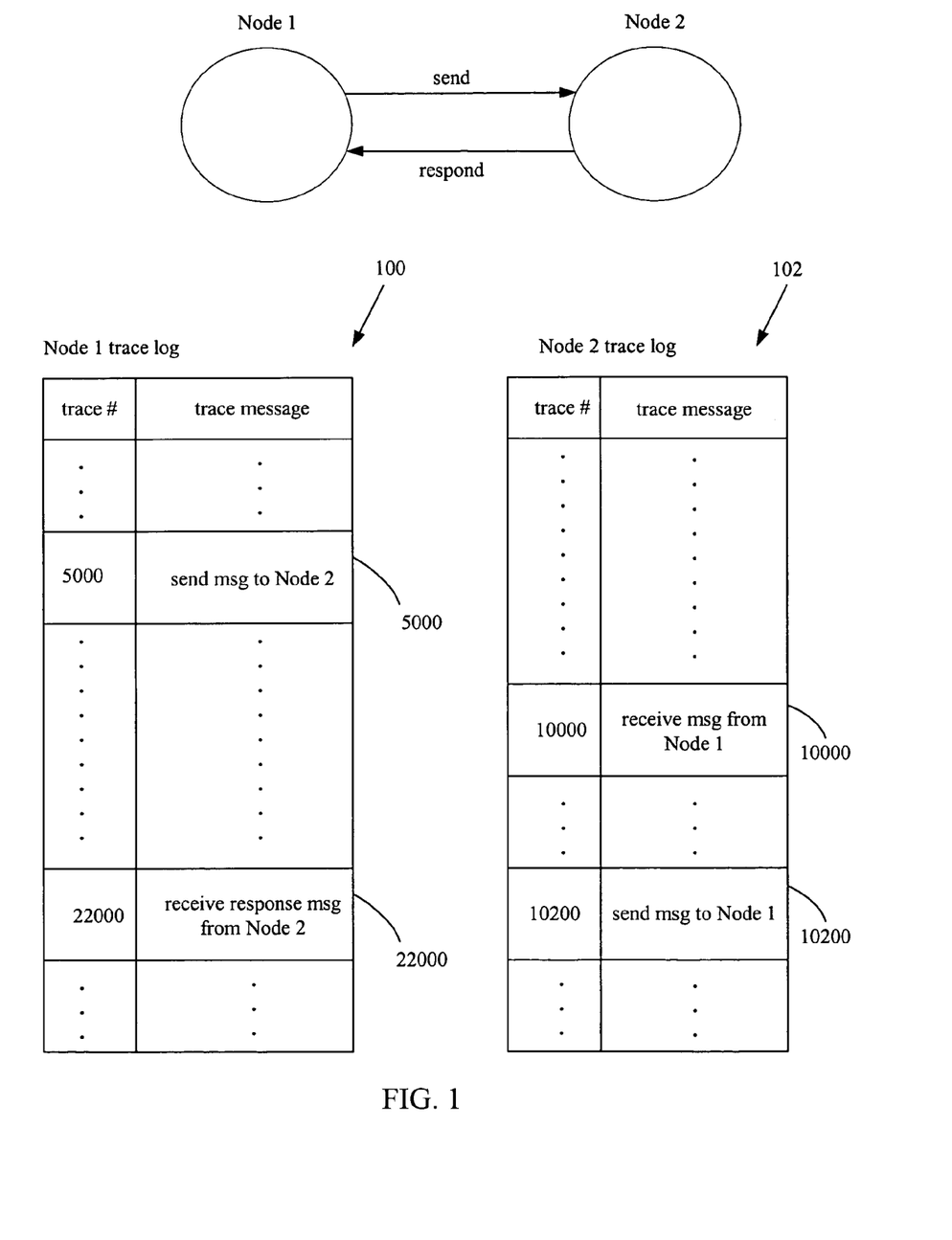
FIG. 1 shows an example of a communications operation between two network nodes and corresponding trace logs.

Analysis of traces is greatly facilitated, pursuant to an embodiment, by using traces implemented with markup language syntax. To illustrate this aspect of the invention, consider a simple communications operation that is performed between two network nodes. FIG. 1 shows Nodes 1 and 2 executing an operation that consists of a first message that is sent from Node 1 to Node 2 and a response message that is subsequently sent from Node 2 to Node 1. Assume that a first trace log 100 maintains traces for threads executing on Node 1 and a second trace log 102 maintains traces for threads executing on Node 2.

When analyzing trace logs for communications operations that send messages between network nodes, it is common for sets of related traces to appear in multiple trace logs across the network. For example, "send" operation trace in a first trace log at a first node often has a counterpart "receive" operation trace located in a second trace log at a second node. Thus in the example of FIG. 1, the trace for the initial "send" operation from Node 1 to Node 2 is stored in log file 100 as trace message 5000. The trace for the "receive" operation that occurs on Node 2 is stored in trace log 102 as trace message 10000. The trace for the subsequent "send response" operation from Node 2 to Node 1 is stored as trace message 10200 in trace log 102. The trace for the "receive" operation that occurs at Node 1 for the response message is stored as trace message 22000 in trace log 100.

Consider if it is desired to analyze/diagnose this communications operation between Node 1 and Node 2. When a programmer analyzes the set of traces corresponding to that communications operation, it is likely that the programmer must review both the send and receive traces. In this example, the send and receive traces for the communications operation are spread across multiple trace logs on multiple nodes, and the traces of interest may be buried among hundreds or thousands of irrelevant traces that correspond to applications/operations of no immediate interest. Even in this very simple example, analysis of the trace logs could involve a complex and time-consuming task just to identify the traces of interest. That difficult task is compounded by the additional burden needed to manually jump between the different trace logs to chase the chain of traces across the multiple network nodes. In the real world, this analysis/diagnosis task could become far more difficult because of messaging operations that involve many more threads across many more network nodes.

To address this problem, one embodiment of the present invention materializes trace messages using a markup language syntax. By implementing trace messages using markup language syntax, navigational intelligence can be embedded into the trace messages using "hyperlinks." A hyperlink is an element in an electronic document or object that links to another place in same document/object or to an entirely different document/object. As noted above, when a programmer analyzes the set of traces corresponding to that communications operation, it is likely that the programmer must review both the send and receive traces. For this reason, it is useful to link related communications traces at the senders and receivers of inter-nodal messages. Thus, a send trace is hyperlinked to its counterpart receive trace. The hyperlinks can be defined in both the forward and reverse directions. A chain of linked traces can be established whereby each trace is hyperlinked in sequential order to both its predecessor and successor trace. All traces relating to a common operation or activity can therefore be linked together via a chain of hyperlinks extending from a first trace through all other related traces.

Figure 2:
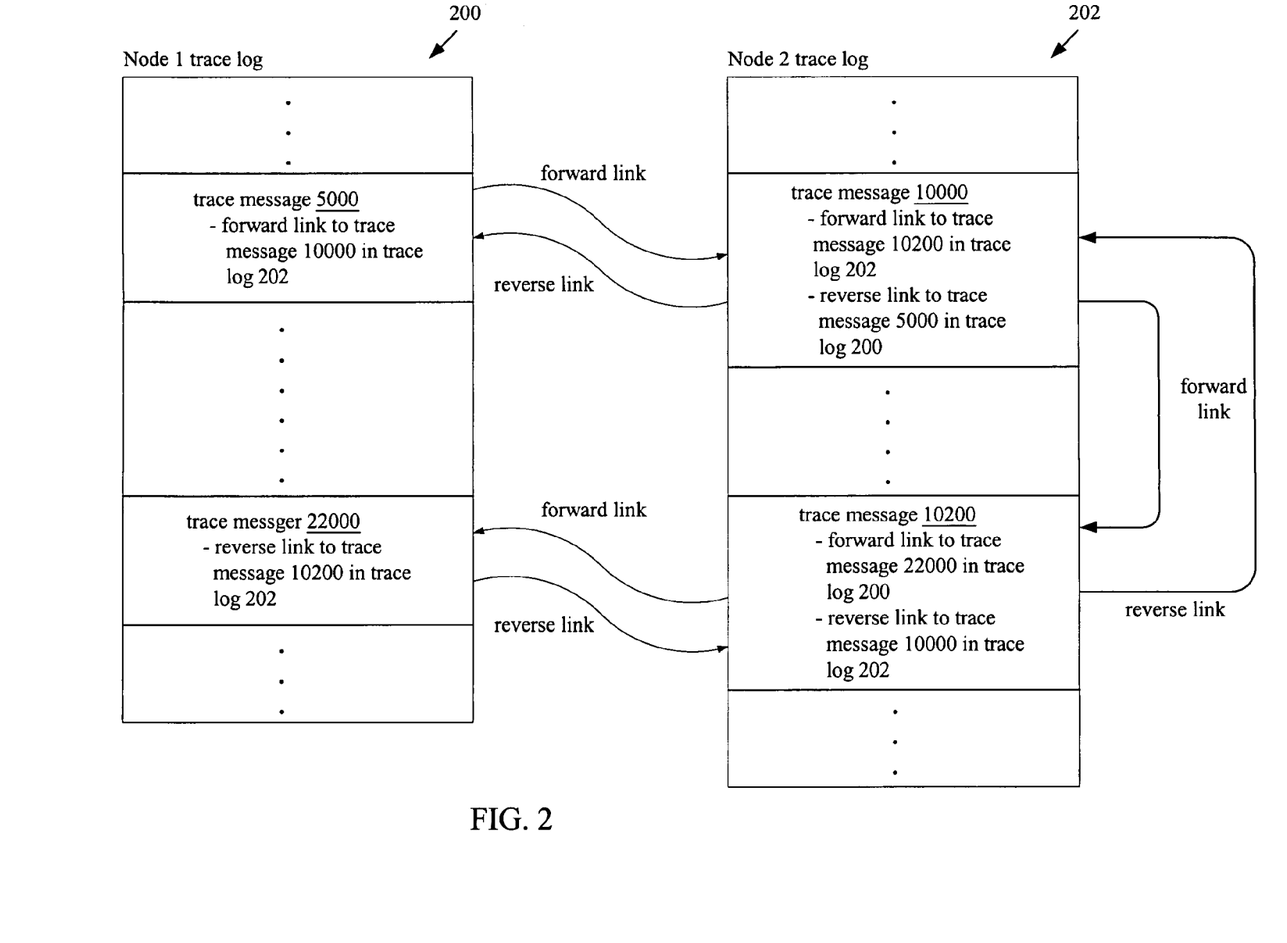
FIG. 2 shows trace logs including traces in markup language pseudocode according to an embodiment of the invention.

FIG. 2 depicts trace logs 200 and 202 that include traces messages implemented using markup language pseudocode. Trace log 200 corresponds to trace log 100 of FIG. 1 and contains traces generated by threads on Node 1. Trace log 202 corresponds to trace log 102 of FIG. 1 and contains traces for threads on Node 2. Each of the trace messages for the communications operation shown in FIG. 1 are represented in FIG. 2 using markup language pseudocode to illustrate hyperlinks between related trace messages. In particular, the "send" trace message 5000 in trace log 200 includes a forward hyperlink to its corresponding "receive" trace message 10000 in trace log 202. The "receive" trace message 10200 includes a reverse hyperlink to the "send" trace message 5000. The "send response" trace message 10200 in trace log 202 is forward linked to its corresponding "receive response" trace message 22000 in trace log 200. The "receive response" trace message 22000 is reverse hyperlinked to the "send response" trace message 10200. While not a send and receive pair, trace messages 10000 and 10200 could be hyperlinked together to indicate the sequential nature of the operations corresponding to these traces. Any suitable markup language syntax may be employed to implement this type of hyperlinking.

Once the trace messages have been materialized into a markup language syntax, any browser or viewer capable of interpreting the chosen markup language may be used to navigate the trace log(s). The traces for any activity of interest can be navigated by identifying one of the activity's traces and traversing the chain of hyperlinks extending from that trace—without requiring any manual searching for related traces. Since both forward and reverse hyperlinks can be embedded into the trace log, the traces for an activity of interest can be traversed in both the forward or reverse directions.

Figure 3:
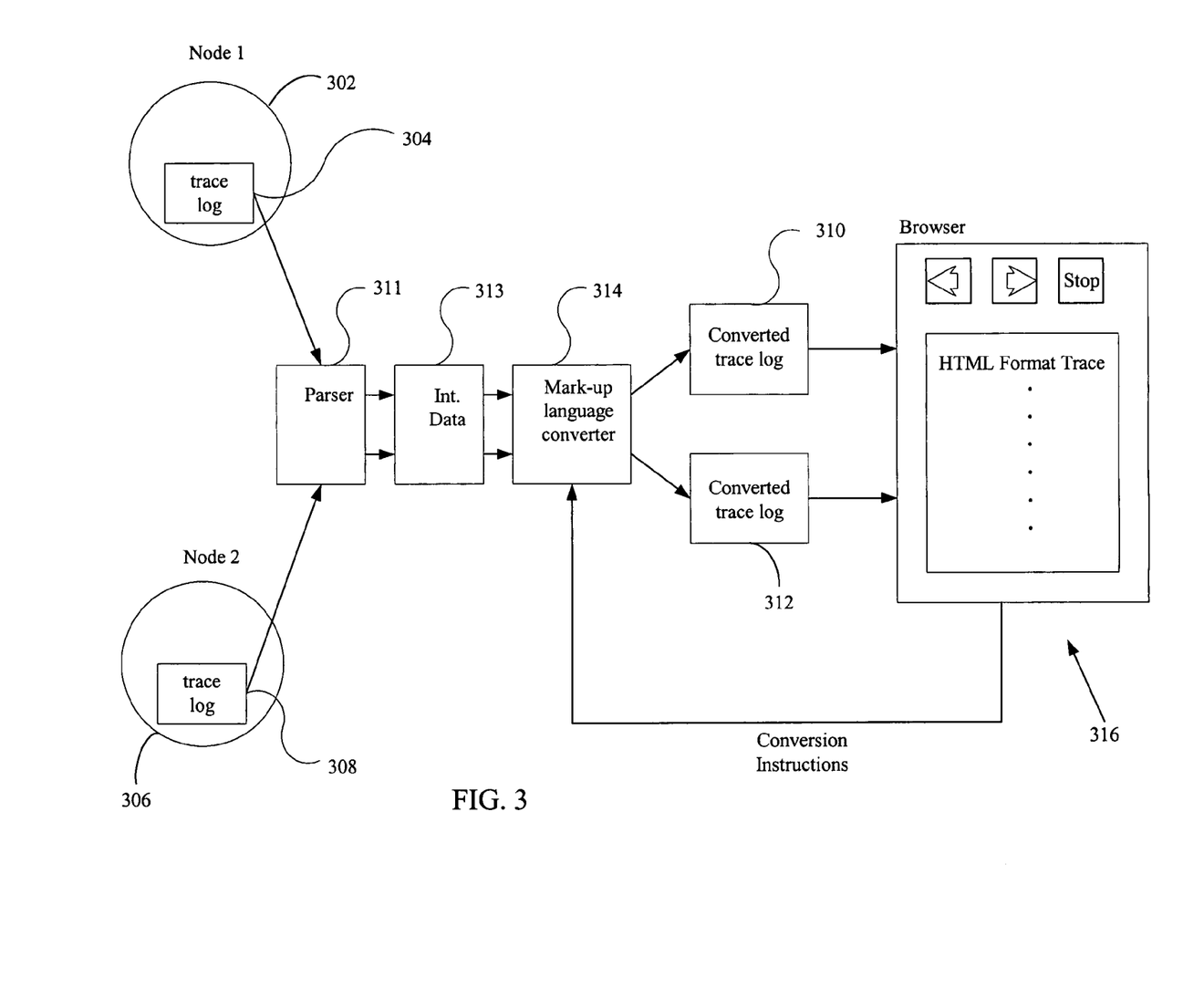
FIG. 3 is a diagram of a system for using and generating traces having markup language syntax according to an embodiment of the invention.

FIG. 3 depicts a diagram of an embodiment of a system for utilizing and materializing trace logs that include markup language syntax. For the purposes of illustration, FIG. 3 shows a first node having a first trace log 304 and a second node 306 having a second trace log 308. According to this embodiment of the invention, trace messages generated by node 302 or 306 are initially parsed by a parser 311 to tokenize the information located in a trace message string. That tokenized information is used to create intermediate data 313 corresponding to the trace messages, such as intermediate hyperlinking information that relates a particular "send" trace with its corresponding "receive" trace. A mark-up language converter mechanism 314 performs a conversion operation to materialize the traces from trace logs 304 and 308 into converted trace logs 310 and 312 in a markup language syntax. A suitable browser 316 can be employed to view the markup language information embedded in trace logs 310 and 312.

According to an embodiment of the invention, trace messages from multiple trace logs can be collected into a single trace log, rather than multiple materialized trace logs 310 and 312 as shown in FIG. 3. Thus, trace log 304 and trace log 308 can be combined into a single set of trace messages. Many types of ordering can be employed to combine trace messages from different trace files. For example, trace messages can be ordered in time/date order. Trace messages can also be sorted based upon the specific resource or type of operation corresponding to a trace message. In addition, specific subsets of trace messages from trace logs 304 and 308 can be operatively selected for conversion into a markup language syntax, to filter out traces that are of no interest.

The present invention also provides a method and mechanism for emphasizing specific traces or portions of traces in a trace log using markup language syntax. According to this aspect of the invention, traces or trace portions of particular interest include markup language elements that provides visual emphasis when viewed in a suitable browser 316. The visual emphasis may encompass any type of visual cue that differentiates one portion of text from another portion of text, such as bolding certain areas of text, using different colors, using different fonts or font sizes, underlining, etc.

This aspect of the invention is useful if it is desired to emphasize traces or portions of traces corresponding to a unique characteristic. For example, consider if it is desired to analyze or diagnose all operations performed against a specific system resource. This would involve identifying all traces that relate to that system resource. A search is performed against the trace logs to identify all traces corresponding to that system resource. During the conversion process, those identified traces would undergo a conversion to include additional markup language elements to visually separate those trace messages from other trace messages. When viewed with browser 316, this "emphasized pattern" would readily highlight all traces corresponding to the system resource of interest. Moreover, hyperlinks can be embedded to permit sequential navigation through all the traces in the emphasized pattern of traces.

Thus, the invention includes a search or filter mechanism to search for particular patterns in the trace logs. Conversion instructions are sent from a user interface to identify specific patterns that should be searched and will be either emphasized or filtered out. In an embodiment, the browser 316 includes an interface for a user to input a string or regular expression to be used for the filter/search procedure. The markup language converter 314 uses the results of the filter/search procedure to determine which trace messages require markup language conversion and what types of conversions are necessary to emphasize patterns.

An embodiment of the invention for converting traces into a markup language format utilizes fixed format trace strings. The process for extracting information from a trace in this approach is driven by knowledge of the position and existence of specific data items in a trace string. For example, unique identifiers for events, operations or other types of data objects are embedded at a recognized location(s) in the trace strings. Extracting these unique identifiers permits efficient correlation between related traces.

Figure 4:
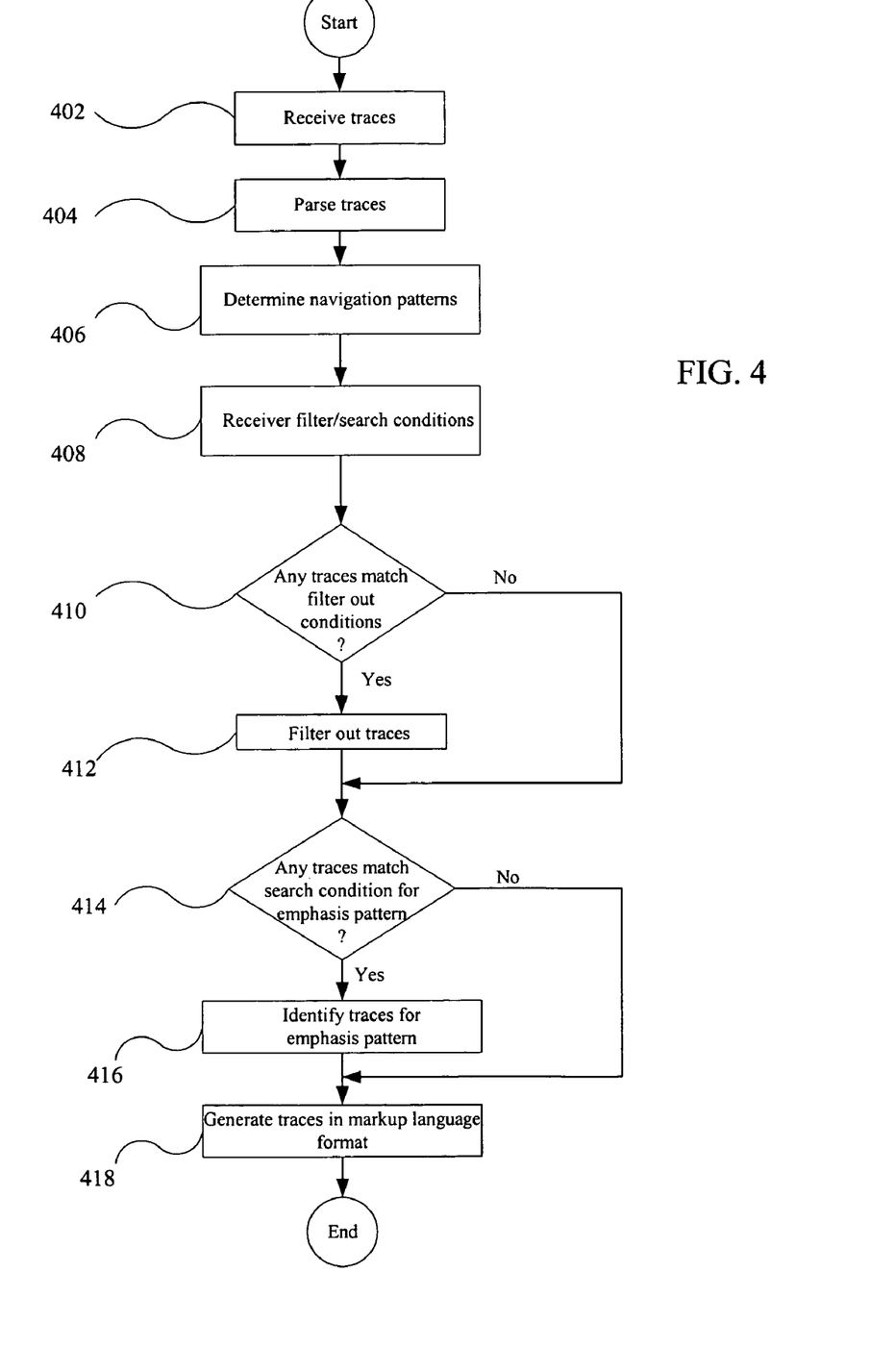
FIG. 4 is a flowchart of a process for materializing traces with markup language syntax according to an embodiment of the invention.

FIG. 4 depicts a flowchart of a process for converting traces from fixed format strings into a markup language format according to one embodiment of the invention. At 402, a trace message is received from a trace log. The trace message is parsed (404) to tokenize and identify information in the trace string needed for the conversion process. Examples of information extracted from the trace string includes timestamps and unique identifiers. A determination is thereafter made regarding navigation patterns to be embedded into the converted trace messages (406). In effect, information extracted from each trace message is compared to information extracted from other trace messages to determine navigable relationships between the traces. The determination is with respect to whether a trace message should be hyperlinked to any other trace messages.

For example 1-to-1 communications involving send and receive pairs of traces are identified at this stage. Information is stored to identify these related traces as candidates for embedded hyperlinks when markup language conversions of the traces are generated. It is noted that other types of communications relationships, including 1-to-many and many-to-many relationships, are also identified at this stage. As an example, a broadcast message is a message that is broadcast from a single node to possibly many nodes. This relationship is also identified at step 406 and intermediate data is stored to distinguish these traces as candidates for hyperlinks when markup language version of the traces are materialized.

A filter or search condition may be established for the traces (408). A user desiring to view a particular emphasized pattern may establish such a filter/search condition. If a filter out condition has been established (410), then a search is performed and any traces matching the filter condition are filtered from the group of traces to be converted into a markup language format (412). Information extracted from the trace string during the parse procedure is used to determine if the trace string should be filtered. For example, a filter may be set to exclude all traces corresponding to a system resource "A". If a trace message corresponding to this filter condition is encountered, then the trace message will be discarded from the conversion process and will not be viewed by the browser 316. If the trace message does not correspond to the filter condition, then the conversion process proceeds for that trace message.

If a search condition has been established for a desired emphasized pattern (414), then a search is performed and any traces matching the search condition are identified as candidates for additional markup language elements to include differentiating visual cues for conversion into a markup language format (416). Information extracted from the trace string during the parse procedure is again used to determine if the trace string should be emphasized.

The traces are thereafter materialized in a markup language format (418). In particular, traces that are part of navigable patterns are materialized to include hyperlinks. Traces that are part of emphasized patterns are materialized to include markup language elements to provide additional visual cues. The materialized traces in markup language format can be viewed using any suitable browser compatible with the particular markup language used for the conversion.

The following represents an example of a generic template that can be used for a fixed trace string:

```
Generic Template:
    <Header><keyword><arg0><arg1><arg2>
    <arg3> . . . <argn>
```

In this generic template, <Header> represents the portion of the trace string containing required data items used for the conversion process. <Keyword> represents one or more keyword "hints" that provide additional information regarding the format/type of arguments that follow. <arg0> through <argn> represents additional arguments to be generated with the trace string.

As a more specific example of a fixed format trace string, consider the following trace string which is generated for a database operation during a deadlock detection ("DD") search by a distributed lock manager ("DLM"):

```
7C839FEF:00000010 5 4 10435 51 DLM-DD start:
    ddTS[0.1][TXN]res[0×1][0×1],[TX], node 0
```

In this example trace string, the <header> portion includes the following information:

```
7C839FEF:00000010 5 4 10435 51
```

This is a fixed format header record representing the following items of information:

```
<timestamp><sid><pid><event><opcode>
``` where,
  a) <timestamp> is "7C839FEF:00000010", which represents the timestamp for the trace;
  b) <sid> is "5", which represents a "session id" for the particular computer/database session in which the operation corresponding to the trace is executed;
  c) <pid> is "4" and which represents a particular process id;
  d) <event> is "10435", which represents an event identifier that allows sets of related operation for an event to be correlated;
  e) <opcode> is "51", which represents an operation identifier for subgrouping within an event that is related to a particular operation.

In the example trace string, "DLM-DD" represents a <keyword> that provides a "hint" regarding the type of operation performed and the type/format of the arguments that follow.

<arg0> is represented by the string "start:". The "start:" value identifies a particular operation or stage of an operation that is performed. Other examples of types of information that may be included in <arg0> for a deadlock detection operation are: "send:—", "receive:—", "found:—", "confirm:—", "drop (victim done):—"

<arg1> is represented by the "ddTS[x.y]" string where x and y are integers which maintain the deadlock search count. The "ddTS[0.1]" value in the example string is a token number that allows related traces (e.g., send-receive pairs) to be identified across multiple nodes.

<arg2> is represented by the "[TXN]res|[PROC]res" string which specified whether it is a process (PROC) owned resource or a transaction (TXN) owned resource.

<arg3> has the value "node 0" to indicate a particular node related to the trace message.

The following represents a series of example trace messages generated for a deadlock detection operation by a distributed lock manager:

Traces from Node 0
    7C839FEF:00000010 5 4 10435 51 DLM-DD start:ddTS[0.1][TXN]res[0×1][0×1],[TX], node 0
    7C839FEF:00000011 5 4 10435 52 DLM-DD send:ddTS[0.1][TXN]res, dest node 3

Traces from Node 3
    7C839FEF:00000050 5 4 10435 52 DLM-DD receive:ddTS[0.1][TXN]res, src node 0
    7C839FEF:00000051 5 4 10435 53 DLM-DD found:ddTS[0.1][TXN]res, valid start, node 3
    7C839FEF:00000052 5 4 10435 54 DLM-DD confirm:ddTS[0.1][TXN]res, origin victim, node 3
    7C839FEF:00000014 5 4 10435 55 DLM-DD drop (victim done):ddTS[0.1][TXN]res, node 3

In the example traces above, the send operation (trace 2 from node 0) and receive operation (trace 1 from node 3) pair form a direct linking pattern where opcode "52" is used to create the link identification. Thus, conversion into a markup language format would result in a hyperlink between these two traces. The following is an example of the conversion of the send operation trace in a HTML-based markup language format:

<HTML>
<BODY>
7c839FEF:00000010 5 4 10435 51 DLM-DD start:ddTS[0,1][TXN]res[0×1][0×1], [TX], n . . . ode0
<BR>
<A HREF="trace_node3.html#52"NAME="52">
7C839FEF:00000011 5 4 10435 52 DLM-DD send:ddTS[0,1][TXN]res, dest node 3
</A>
</BODY>
</HTML>

The following is another example of converting the receive operation trace into a HTML-based markup language format:

<HTML>
<BODY>
<A HREF="trace_node0.html#52"NAME="52">
7C89FEF:00000050 5 4 10435 52 DLM-DD receive:ddTS[0,1][TXN]res, src node 0
</A>
<BR>
7C839FEF:00000051 5 4 10435 53 DLM-DD found:ddTS[0,1][TXN]res, valid start, node . . . ode 3
<BR>
7C839FEF:00000014 5 4 10435 55 DLM-DD drop (victim done):ddTS[0,1][TXN]res, node . . . 3
</BODY>
</HTML>

In the examples above, traces for a particular deadlock detection operation can also be found with keyword DLM-DD as the primary key and arg1 (ddTS[x.y]) as the secondary key.

In the above example, a possible emphasizing pattern that can be identified could be to establish a search filter for all traces for transaction based resources grouped by string [TXN]res. If it is desired to emphasize this pattern, the following is an example of a converted markup language format for these traces:

<HTML>
<BODY>
<B>7C839FEF:00000010 5 4 10435 51 DLM-DD start:ddTS[0,1][TXN]res[0×1][0×1],[TX . . . ], node0</B>
<<BR>
<B>7C839FEF:00000011 5 4 10435 52 DLM-DD send:ddTS[0,1][TXN]res, dest node 3</B>
</BODY>
</HTML>

The following is another example of a converted trace having this emphasized pattern:

<HTML>
<BODY>
<B>
7C89FEF:00000050 5 4 10435 52 DLM-DD receive:ddTS[0,1][TXN]res, src node 0 </B>
<BR>
<B>
7C839FEF:00000051 5 4 10435 53 DLM-DD found:ddTS[0,1][TXN]res, valid start, node . . . 3
</B>
<BR>
<B>
7C839FEF:00000052 5 4 10435 54 DLM-DD confirm:ddTS[0,1][TXN]res, origin victim, n . . . ode 3
</B>
<BR>
<B>
7C839FEF:00000 5 4 10435 55 DLM-DD drop (victim done):ddTS[0,1][TXN]res, node . . . 3
</B>
</BODY>
</HTML>

SYSTEM ARCHITECTURE OVERVIEW

Figure 5:
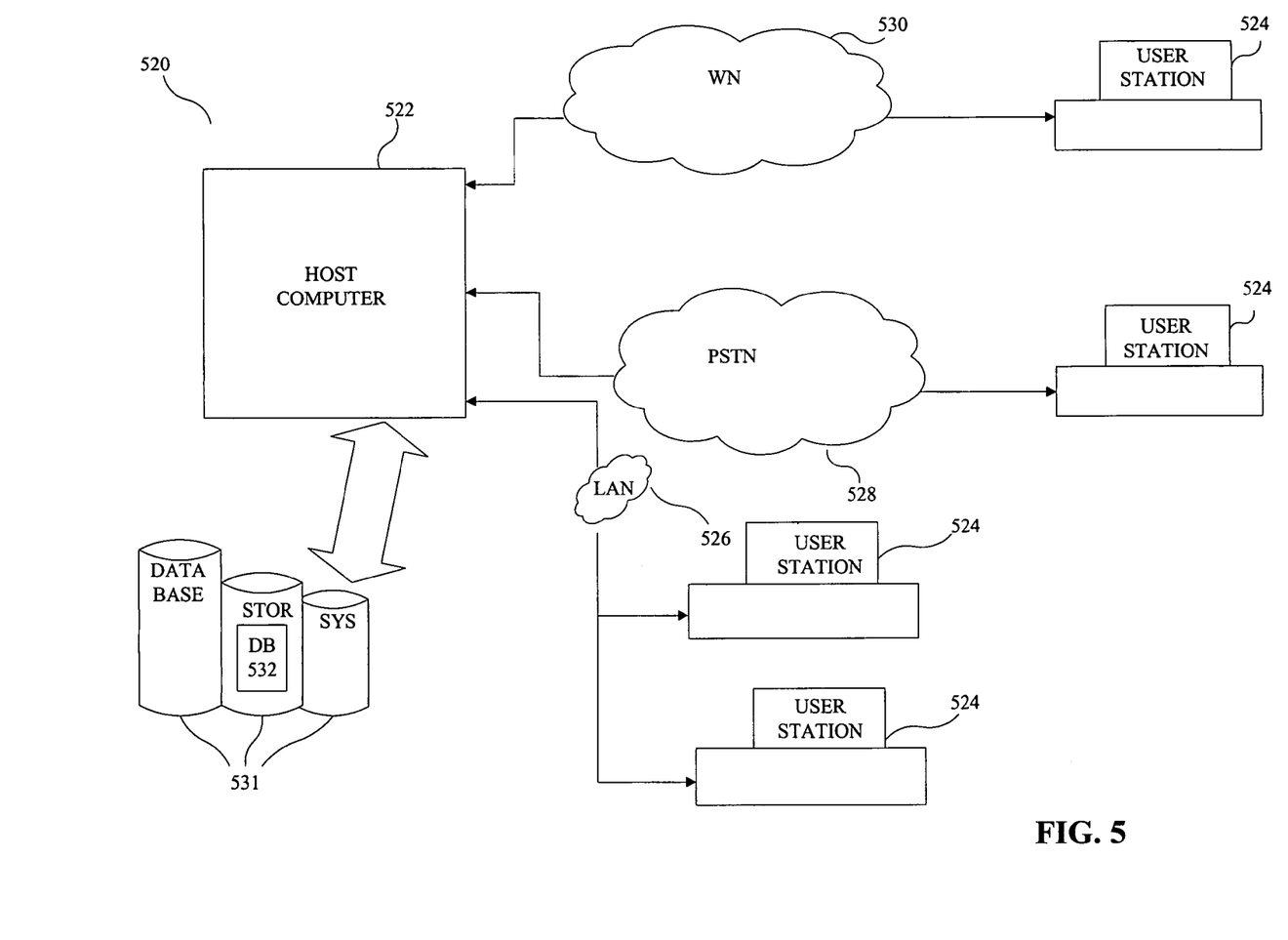
FIGS. 5 and 6 are diagrams of system architectures with which the present invention may be implemented.

Referring to FIG. 5, in an embodiment, a computer system 520 includes a host computer 522 connected to a plurality of individual user stations 524. In an embodiment, the user stations 524 each comprise suitable data terminals, for example, but not limited to, e.g., personal computers, portable laptop computers, or personal data assistants ("PDAs"), which can store and independently run one or more applications, i.e., programs. For purposes of illustration, some of the user stations 524 are connected to the host computer 522 via a local area network ("LAN") 526. Other user stations 524 are remotely connected to the host computer 522 via a public telephone switched network ("PSTN") 528 and/or a wireless network 530.

In an embodiment, the host computer 522 operates in conjunction with a data storage system 531, wherein the data storage system 531 contains a database 532 that is readily accessible by the host computer 522. Note that a multiple tier architecture can be employed to connect user stations 524 to a database 532, utilizing for example, a middle application tier (not shown). In alternative embodiments, the database 532 may be resident on the host computer, stored, e.g., in the host computer's ROM, PROM, EPROM, or any other memory chip, and/or its hard disk. In yet alternative embodiments, the database 532 may be read by the host computer 522 from one or more floppy disks, flexible disks, magnetic tapes, any other magnetic medium, CD-ROMs, any other optical medium, punchcards, papertape, or any other physical medium with patterns of holes, or any other medium from which a computer can read. In an alternative embodiment, the host computer 522 can access two or more databases 532, stored in a variety of mediums, as previously discussed.

Figure 6:
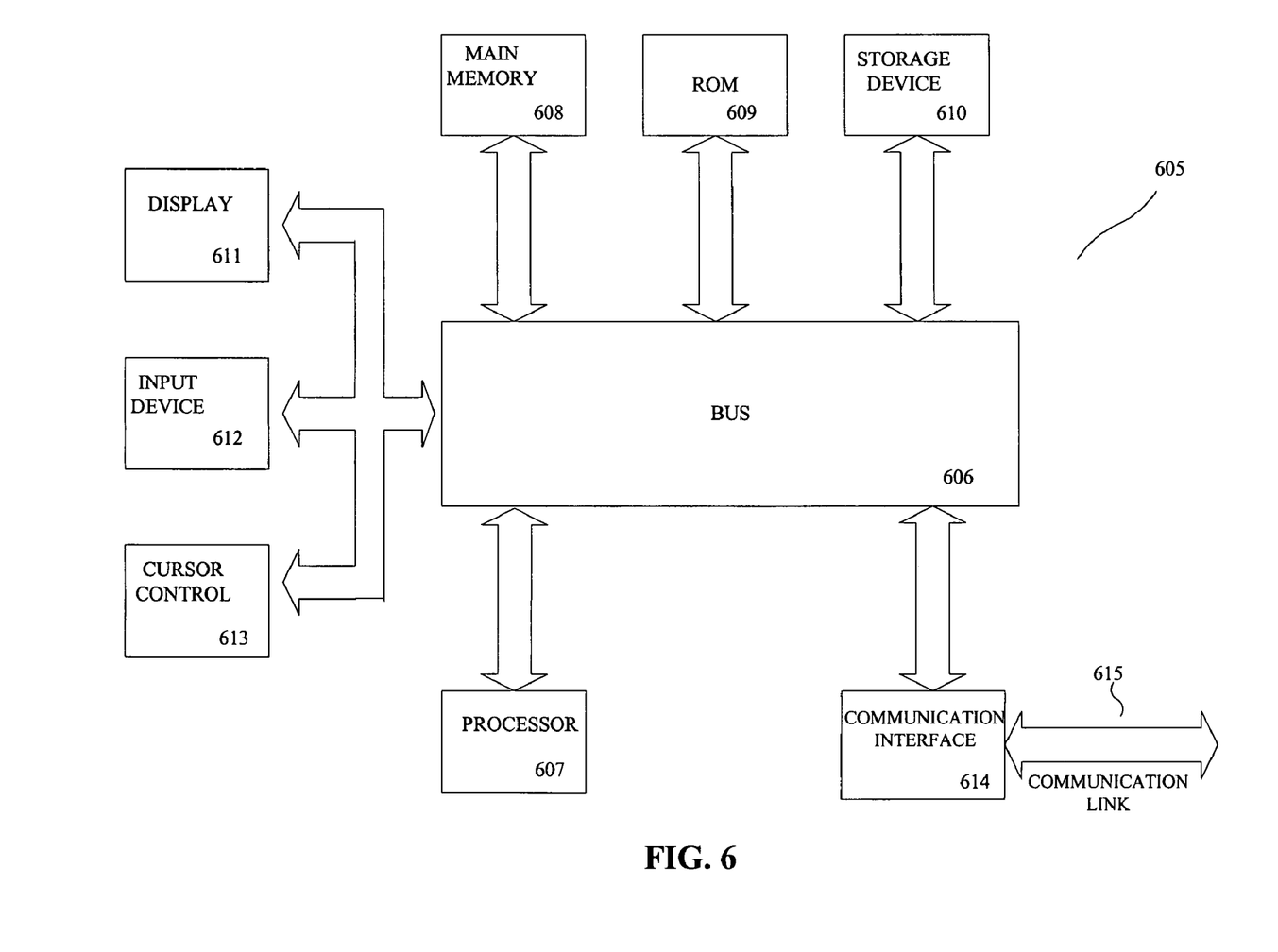

Referring to FIG. 6, in an embodiment, each user station 524 and the host computer 522, each referred to generally as a processing unit, embodies a general architecture 605. A processing unit includes a bus 606 or other communication mechanism for communicating instructions, messages and data, collectively, information, and one or more processors 607 coupled with the bus 606 for processing information. A processing unit also includes a main memory 608, such as a random access memory (RAM) or other dynamic storage device, coupled to the bus 606 for storing dynamic data and instructions to be executed by the processor(s) 607. The main memory 608 also may be used for storing temporary data, i.e., variables, or other intermediate information during execution of instructions by the processor(s) 607. A processing unit may further include a read only memory (ROM) 609 or other static storage device coupled to the bus 606 for storing static data and instructions for the processor(s) 607. A storage device 610, such as a magnetic disk or optical disk, may also be provided and coupled to the bus 606 for storing data and instructions for the processor(s) 607.

A processing unit may be coupled via the bus 606 to a display device 611, such as, but not limited to, a cathode ray tube (CRT), for displaying information to a user. An input device 612, including alphanumeric and other columns, is coupled to the bus 606 for communicating information and command selections to the processor(s) 607. Another type of user input device may include a cursor control 613, such as, but not limited to, a mouse, a trackball, a fingerpad, or cursor direction columns, for communicating direction information and command selections to the processor(s) 607 and for controlling cursor movement on the display 611.

According to one embodiment of the invention, the individual processing units perform specific operations by their respective processor(s) 607 executing one or more sequences of one or more instructions contained in the main memory 608. Such instructions may be read into the main memory 608 from another computer-usable medium, such as the ROM 609 or the storage device 610. Execution of the sequences of instructions contained in the main memory 608 causes the processor(s) 607 to perform the processes described herein. In alternative embodiments, hard-wired circuitry may be used in place of or in combination with software instructions to implement the invention. Thus, embodiments of the invention are not limited to any specific combination of hardware circuitry and/or software.

The term "computer-usable medium," as used herein, refers to any medium that provides information or is usable by the processor(s) 607. Such a medium may take many forms, including, but not limited to, non-volatile and volatile media. Nonvolatile media, i.e., media that can retain information in the absence of power, includes the ROM 609. Volatile media, i.e., media that can not retain information in the absence of power, includes the main memory 608. Transmission media includes coaxial cables, copper wire and fiber optics, including the wires that comprise the bus 606. Transmission media can also take the form of carrier waves; i.e., electromagnetic waves that can be modulated, as in frequency, amplitude or phase, to transmit information signals. Additionally, transmission media can take the form of acoustic or light waves, such as those generated during radio wave and infrared data communications.

Common forms of computer-usable media include, for example: a floppy disk, flexible disk, hard disk, magnetic tape, any other magnetic medium, CD-ROM, any other optical medium, punchcards, papertape, any other physical medium with patterns of holes, RAM, ROM, PROM (i.e., programmable read only memory), EPROM (i.e., erasable programmable read only memory), including FLASH-EPROM, any other memory chip or cartridge, or any other medium from which a processor 607 can retrieve information. Various forms of computer-usable media may be involved in providing one or more sequences of one or more instructions to the processor(s) 607 for execution. The instructions received by the main memory 608 may optionally be stored on the storage device 610, either before or after their execution by the processor(s) 607.

Each processing unit may also include a communication interface 614 coupled to the bus 606. The communication interface 614 provides two-way communication between the respective user stations 524 and the host computer 522. The communication interface 614 of a respective processing unit transmits and receives electrical, electromagnetic or optical signals that include data streams representing various types of information, including instructions, messages and data. A communication link 615 links a respective user station 524 and a host computer 522. The communication link 615 may be a LAN 526, in which case the communication interface 614 may be a LAN card. Alternatively, the communication link 615 may be a PSTN 528, in which case the communication interface 614 may be an integrated services digital network (ISDN) card or a modem. Also, as a further alternative, the communication link 615 may be a wireless network 530. A processing unit may transmit and receive messages, data, and instructions, including program, i.e., application, code, through its respective communication link 615 and communication interface 614. Received program code may be executed by the respective processor(s) 607 as it is received, and/or stored in the storage device 610, or other associated non-volatile media, for later execution.

In the foregoing specification, the invention has been described with reference to specific embodiments thereof. It will, however, be evident that various modifications and changes may be made thereto without departing from the broader spirit and scope of the invention. For example, the reader is to understand that the specific ordering and combination of process actions shown in the process flow diagrams described herein is merely illustrative, and the invention can be performed using different or additional process actions, or a different combination or ordering of process actions. The specification and drawings are, accordingly, to be regarded in an illustrative rather than restrictive sense.

The invention claimed is:

1. A process for materializing a trace in a markup language syntax, comprising:
    receiving a first trace over a network, the first trace associated with a first trace log, in which the first trace is generated in response to a flow of execution of a software application;

parsing the first trace;

generating a new version of the first trace in a markup language syntax in response to the flow of execution of the software application;

analyzing a second trace log, identify and hyperlink corresponding trace in the second trace log; and storing the new version of the first trace in computer usable medium, wherein the new version of the first trace is capable of navigating to one or more corresponding second traces associated with one or more second trace logs and comprises a hyperlink to another trace.

2. The process of claim 1 further comprising the act of:
generating one or more navigation patterns based in part upon results of parsing the trace string.

3. The process of claim 1 in which the hyperlink comprises a forward link.

4. The process of claim 1 in which the hyperlink comprises a reverse link.

5. The process of claim 1 in which the hyperlink comprises links to a plurality of other traces.

6. The process of claim 1 in which the hyperlink corresponds to a communications operation involving another trace.

7. The process of claim 6 in which the communications operation is a 1-to-1 operation.

8. The process of claim 6 in which the communications operation is a 1-to-many operation.

9. The process of claim 1 further comprising:
receiving a search condition for emphasizing a pattern.

10. The process of claim 9 in which the new version of the trace in markup language syntax comprises a markup language statement for visually highlighting the trace.

11. The process of claim 1 further comprising:
receiving a filter condition for filtering out the trace.

12. The process of claim 1 in which the markup language syntax comprises a variant of SGML.

13. The process of claim 12 in which the markup language syntax comprises XML.

14. The process of claim 1 further comprising:
viewing the new version of the trace in markup language syntax using a browser capable of understanding the markup language syntax.

15. The method of claim 1 further comprises:
receiving at least one of the one or more second traces over a network, the at least one of the one or more second traces associated with at least one of the one or more second trace logs; and
parsing the at least one of the one or more second trace to identify a second information.

16. A system for utilizing a trace materialized in markup language syntax, comprising:
a first trace, the trace associated with a first trace log, in which the first trace is generated in response to a flow of execution of a software application;
a parser that parses the first trace;
a processor analyzing a second trace log, identify and hyperlink corresponding trace in the second trace log;
a markup language converter mechanism to automatically convert the first trace into a new version of the first trace in a markup language syntax in response to the flow of execution of the software application;
means for storing the new version of the first trace in a computer usable medium; and
a browser to view the new version of the first trace in the markup language syntax, wherein the new version of the first trace capable of navigating to one or more corresponding second traces associated with one or more second trace logs and comprises a hyperlink to another trace.

17. The system of claim 16 further comprising:
data based upon results of parsing the first trace.

18. The system of claim 16 in which the hyperlink comprises links to a plurality of other traces.

19. The system of claim 16 in which the hyperlink corresponds to a communications operation involving another trace.

20. The process of claim 19 in which the communications operation is a 1-to-1 operation.

21. The system of claim 19 in which the communications operation is a 1-to-many operation.

22. The system of claim 16 in which the new version of the first trace in the markup language syntax comprises a markup language statement for visually highlighting the trace.

23. The system of claim 16 in which the markup language syntax comprises a variant of SGML.

24. The process of claim 23 in which the markup language syntax comprises XML.

25. The system of claim 16 further comprising a second trace log comprising a second trace and in which the second trace is converted into a new version of the second trace in the markup language syntax.

26. The system of claim 25 in which the new version of the first trace and the new version of the second trace are stored in a new trace log.

27. The system of claim 25 in which the new version of the first trace and the new version of the second trace are stored in separate new trace logs.

28. The system of claim 26 in which the new trace log is sorted in time order.

29. A computer program product that includes a computer-usable volatile or nonvolatile medium having a sequence of instructions which, when executed by a processor, causes said processor to execute a process for materializing a trace in a markup language syntax, said process comprising:
receiving a first trace, the first trace associated with a first trace log, in which the first trace is generated in response to a flow of execution of a software application;
parsing the first trace;
analyzing a second trace log to identify and hyperlink corresponding trace in the second trace log; and
generating a new version of the first trace in a markup language syntax in response to the flow of execution of the software application and storing the new version of the first trace in a computer usable medium, wherein the new version of the first trace is capable of navigating to one or more corresponding second traces associated with one or more second trace logs and comprises a hyperlink to another trace.

30. The method of claim 15 further comprises:
comparing the first information with a second information; and
determining a navigation pattern between the trace and the second trace based in part upon a result of the comparing step.

* * * * *

UNITED STATES PATENT AND TRADEMARK OFFICE
CERTIFICATE OF CORRECTION

| | | |
|---|---|---|
| PATENT NO. | : 7,380,239 B1 | |
| APPLICATION NO. | : 09/872647 | |
| DATED | : May 27, 2008 | |
| INVENTOR(S) | : Srivastava et al. | |

It is certified that error appears in the above-identified patent and that said Letters Patent is hereby corrected as shown below:

Title Pg, Item (56) on page 2, in column 1, under "Other Publications", line 4-5, below "450.*" delete "Helmbold et al., Determining possible event orders by analysing sequential traces, IEEE, vol. 4, p. 827-840.*".

Title Pg, Item (56) on page 2, in column 2, under "Other Publications", line 26, delete "Poerty" and insert -- Poetry --, therefor.

Title Pg, Item (56) on page 2, in column 2, under "Other Publications", line 30, before "High" delete "(".

Title Pg, Item (56) on page 2, in column 2, under "Other Publications", line 39, delete "Steven" and insert -- Steve --, therefor.

Title Pg, Item (56) on page 3, in column 1, under "Other Publications", line 39, delete "331-334." and insert -- 331-344. --, therefor.

Title Pg, Item (56) on page 3, in column 1, under "Other Publications", line 52, delete "Assocation" and insert -- Association --, therefor.

Title Pg, Item (56) on page 3, in column 1, under "Other Publications", line 63, after "(ACL)" delete "." and insert -- , --, therefor.

Title Pg, Item (56) on page 3, in column 1, under "Other Publications", line 64, after "(ALLC)" delete "," and insert -- . --, therefor.

UNITED STATES PATENT AND TRADEMARK OFFICE
CERTIFICATE OF CORRECTION

| | |
|---|---|
| PATENT NO. | : 7,380,239 B1 |
| APPLICATION NO. | : 09/872647 |
| DATED | : May 27, 2008 |
| INVENTOR(S) | : Srivastava et al. |

It is certified that error appears in the above-identified patent and that said Letters Patent is hereby corrected as shown below:

Title Pg, Item (56) on page 3, in column 1, under "Other Publications", line 66, delete "Tabeltops" and insert -- Tabletops --, therefor.

Title Pg, Item (56) on page 3, in column 2, under "Other Publications", line 9, after "2000." delete "(".

Title Pg, Item (56) on page 4, in column 1, under "Other Publications", line 5, delete "M." and insert -- K. --, therefor.

On sheet 2 of 6, Figure 2, Ref. Numeral 200, line 6, delete "messger" and insert -- message --, therefor.

In column 5, line 44, after "example" insert -- , --.

In column 7, line 45, delete "7c839FEF" and insert -- 7C839FEF --, therefor.

In column 8, line 19, delete "<<BR>" and insert -- <BR> --, therefor.

In column 11, line 5, in Claim 1, after "log" delete "," and insert -- to --, therefor.

In column 11, line 6, in Claim 1, before "corresponding" insert -- a --.

UNITED STATES PATENT AND TRADEMARK OFFICE
CERTIFICATE OF CORRECTION

PATENT NO.         : 7,380,239 B1
APPLICATION NO.    : 09/872647
DATED              : May 27, 2008
INVENTOR(S)        : Srivastava et al.

It is certified that error appears in the above-identified patent and that said Letters Patent is hereby corrected as shown below:

In column 11, line 8, in Claim 1, delete "usable" and insert -- readable --, therefor.

Signed and Sealed this

Seventh Day of July, 2009

JOHN DOLL
*Acting Director of the United States Patent and Trademark Office*